No. 647,208. Patented Apr. 10, 1900.
L. J. VOGT.
PHOTOGRAPHIC SHUTTER.
(Application filed Jan. 17, 1898.)
(Model.) 4 Sheets—Sheet 1.
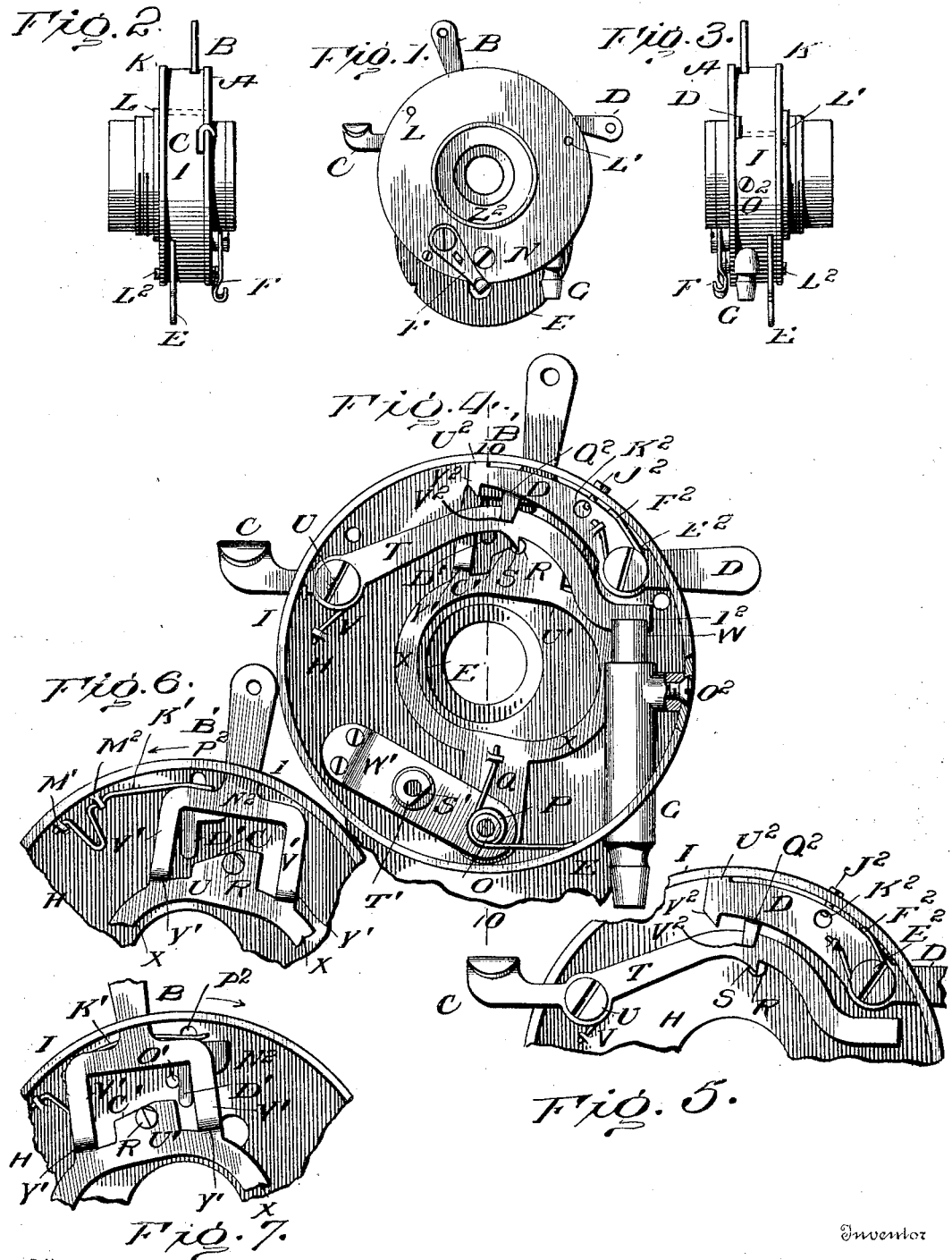
Witnesses
Jno Innie
David W. Gould.
Inventor
Louis J. Vogt
by Geo. B. Selden
Attorneys.
THE NORRIS PETERS CO., PHOTO-LITHO., WASHINGTON, D. C.

No. 647,208. Patented Apr. 10, 1900.
L. J. VOGT.
PHOTOGRAPHIC SHUTTER.
(Application filed Jan. 17, 1898.)
(Model.) 4 Sheets—Sheet 2.
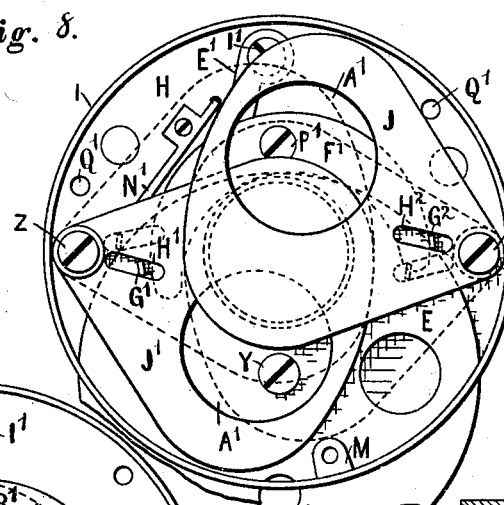
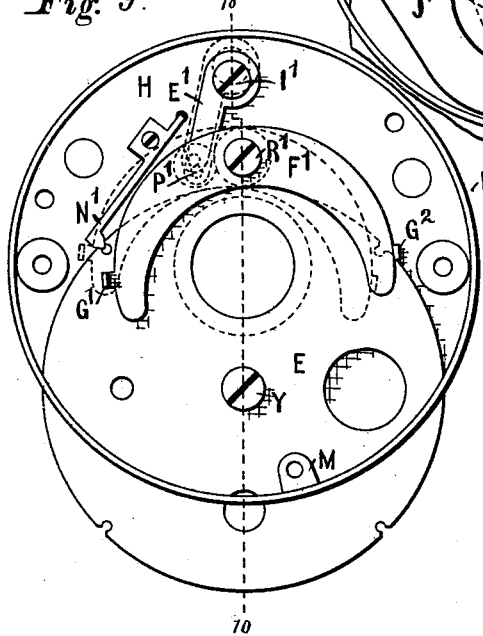
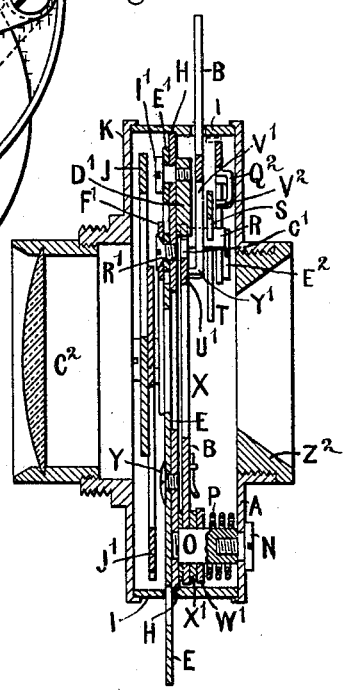
WITNESSES:
INVENTOR:
Louis J. Vogt.
By Geo. B. Selden,
atty.
THE NORRIS PETERS CO., PHOTO-LITHO., WASHINGTON, D. C.

No. 647,208. Patented Apr. 10, 1900.
L. J. VOGT.
PHOTOGRAPHIC SHUTTER.
(Application filed Jan. 17, 1898.)
(Model.) 4 Sheets—Sheet 3.
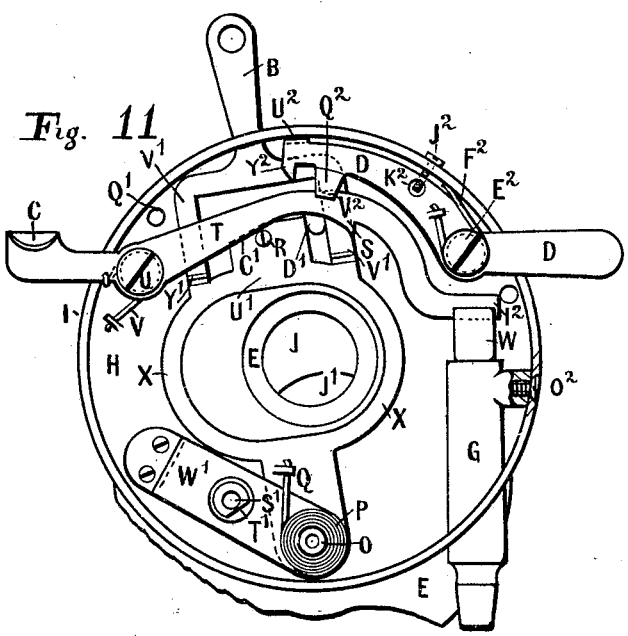
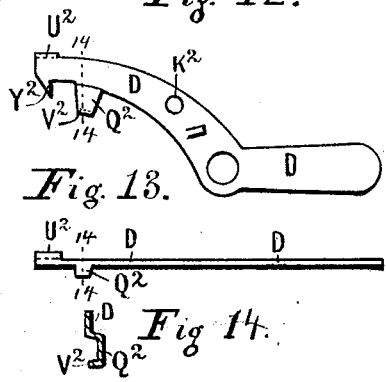
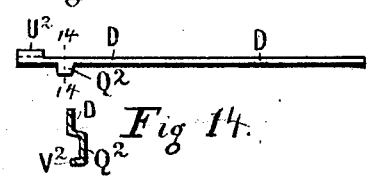
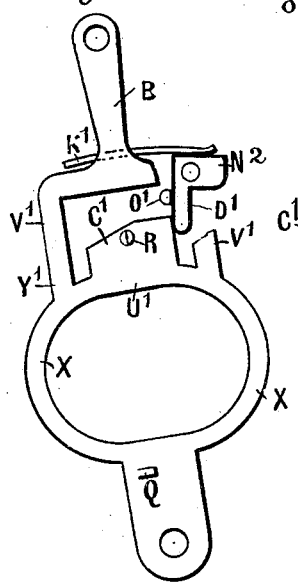
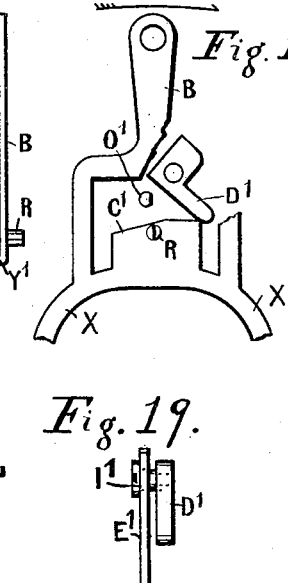
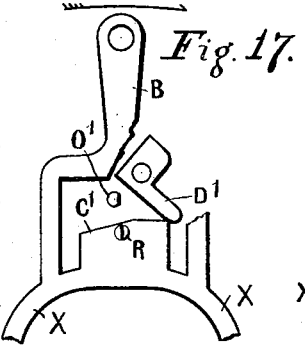
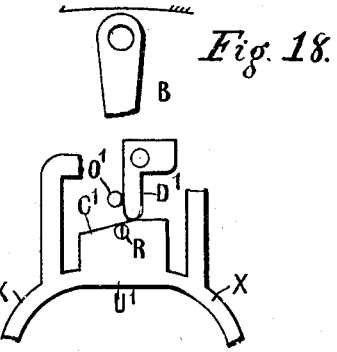
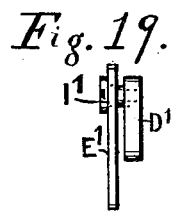
Witnesses
Dan! B. Platt
C. G. Crannell
Inventor
L. J. Vogt,
By Geo. B. Selden,
Attorney
THE NORRIS PETERS CO., PHOTO-LITHO., WASHINGTON, D. C.

No. 647,208. Patented Apr. 10, 1900.
L. J. VOGT.
PHOTOGRAPHIC SHUTTER.
(Application filed Jan. 17, 1898.)
(Model.) 4 Sheets—Sheet 4.
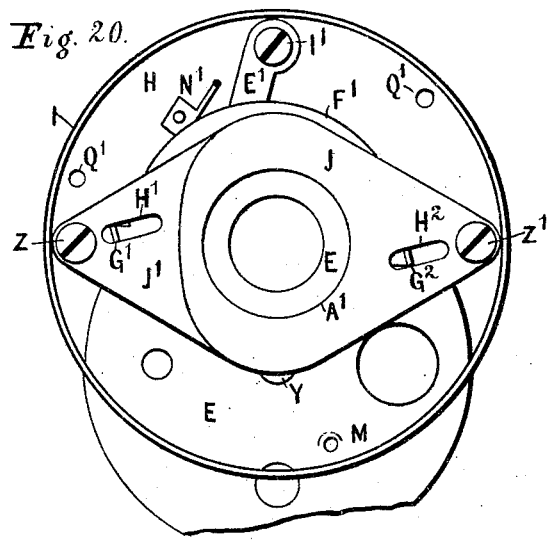
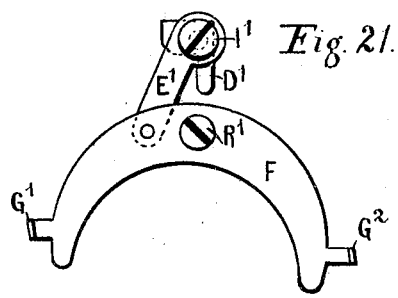
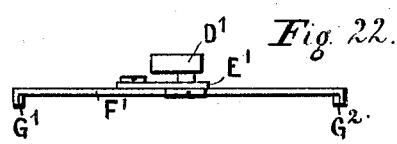
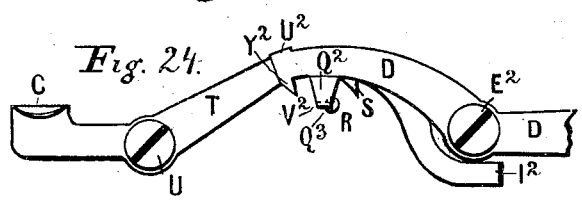
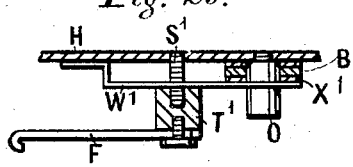
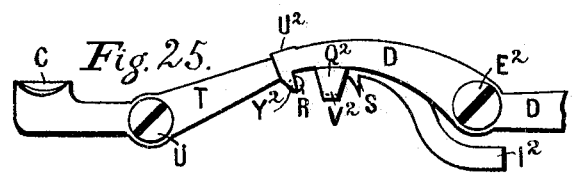
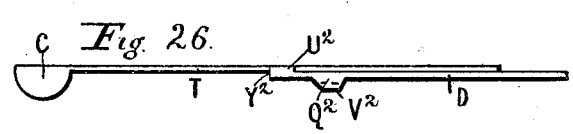
Witnesses
Dan'l B Platt
C. G. Crannell
Inventor
L. J. Vogt,
By Geo. B. Selden,
Attorney
THE NORRIS PETERS CO., PHOTO-LITHO., WASHINGTON, D. C.

UNITED STATES PATENT OFFICE.

LOUIS J. VOGT, OF ROCHESTER, NEW YORK, ASSIGNOR, BY MESNE ASSIGNMENTS, TO THE REICHENBACH, MOREY & WILL COMPANY, OF SAME PLACE.

PHOTOGRAPHIC SHUTTER.

SPECIFICATION forming part of Letters Patent No. 647,208, dated April 10, 1900.

Application filed January 17, 1898. Serial No. 666,920. (Model.)

*To all whom it may concern:*

Be it known that I, LOUIS J. VOGT, a citizen of the United States, residing at Rochester, New York, have invented certain Improvements in Photographic Shutters, of which the following is a specification, reference being had to the accompanying drawings.

My present invention relates to certain improvements in the construction of exposing-shutters for photographic lenses, having for their object to render such devices simpler, cheaper, and more durable.

My improvements are fully described and illustrated in the following specification and the accompanying drawings, the novel features thereof being specified in the annexed claims.

In the accompanying drawings, representing my present improvements in photographic shutters, Figure 1 is a front view. Fig. 2 is a side elevation as seen from the left in Fig. 1. Fig. 3 is a side elevation as seen from the right in Fig. 1. Fig. 4 is a front view, the front plate being removed, showing the operating-lever and the instantaneous and time exposure mechanism, the position when the shutter is set for an exposure being indicated by the full lines. Fig. 5 is a front view of the exposing-lever and time-lever. Fig. 6 represents the upper portion of the operating-lever set for an exposure. Fig. 7 represents the same after an exposure. Fig. 8 is a rear elevation showing the exposing-blades. Fig. 9 is a rear view, the blades being omitted and showing the oscillating beam for operating the blades. Fig. 10 is a central vertical section on the line 10 10, Figs. 4 and 9. Fig. 11 is a front view, the front plate being omitted and the parts shown in the unset position with the blades closed. Figs. 12 and 13 are views of the time-lever. Fig. 14 is a section on the lines 14 14, Fig. 13. Fig. 15 represents the setting-lever and the pawl in the unset position. Fig. 16 is a side view of the setting-lever. Figs. 17 and 18 represent the operation of the setting-lever and its cam on the pawl. Fig. 19 is a side view of the pawl and link detached. Fig. 20 is a rear elevation, the rear plate being omitted, showing the blades in the position of full exposure. Fig. 21 represents the vibrating lever, the link, and the pawl as seen from the rear detached. Fig. 22 is a plan view of the same. Fig. 23 is a plan view of the brake or retarding device. Figs. 24 and 25 are side views of the exposing-lever and time-lever, showing successive steps in a time or bulb exposure. Fig. 26 is a plan of the exposing-lever and the time-lever. Fig. 27 represents the hook for the time-lever.

In the accompanying drawings, A represents the front plate; B, the setting-lever; C, the releasing or exposing lever; D, the time-lever; E, the revolving diaphragm, and F the brake-lever. In order to set the shutter, the lever B is shifted to B', Fig. 4, and the lever C is depressed to produce an exposure, or the exposure is secured by a bulb and tube attached to the pump G.

H is a perforated disk or diaphragm, which extends across the casing I and separates the actuating mechanism from the exposing-blades J J'. The diaphragm H is inserted against an interior shoulder in the casing I. It may be soldered in or otherwise secured. The rear plate K is held in place by the screws L L', which extend through the diaphragm H at Q', Fig. 8, and are threaded into the front plate A. The screw $L^2$ is also used to secure the back plate, being threaded into an eye M, Figs. 8, 9, and 20, attached to the casing. The front A is also attached to the casing by the screw N, Fig. 1, which is threaded into a post O, Figs. 4, 10, and 11, inserted in the diaphragm, and on which post the setting-lever B is pivoted.

P is a spring coiled about the post O and bearing at one end against the casing and at the other against a lug or lip Q on the lever and which gives the lever a constant tendency to move from right to left in Figs. 1 and 4.

R is a stud on the setting-lever, which engages with a catch S on the exposing or releasing lever T, which is pivoted on a stud U, Figs. 4, 5, and 11, and is provided with the thumb-piece C outside the case. A spring V, Figs. 4 and 11, coiled about the stud U, gives the inner end of the lever T a constant downward tendency, so that the lug R engages with the catch S when the shutter is set for an exposure.

In Figs. 4 and 6 the setting-lever B is represented in full lines in the position it occupies when the shutter is set ready for an exposure. By depressing the outer end C of the releasing-lever the catch S is disengaged from the stud R and the setting-lever is swung from right to left by the spring P, this movement operating the exposing-blades, as hereinafter explained; or the exposure may be effected by a pneumatic attachment, a compressible bulb being connected by a tube to the pump G, the entrance of air into which raises the plunger W, which bears against an extension $I^2$ of the lever T. The upper end of the plunger W is slotted to receive the extension $I^2$. The pump is fastened in place by a screw $O^2$, Figs. 3, 4, and 11.

It will be observed from Fig. 4, which, with the succeeding figures, is made on an enlarged scale, that the setting-lever B is provided with a central opening having curved arms X on each side, which permit the lever to oscillate without obstructing the passage of light through the aperture of the shutter. In Figs. 4, 10, and 11 the aperture through the shutter is shown as partially restricted by the revolving diaphragm E, which is pivoted at Y, Figs. 8 and 9, to the rear side of the intermediate plate H and is located between it and the exposing-blades. The diaphragm E is provided with a number of apertures of different sizes adapted to the requirements of the photographer in the restriction of the light and the obtaining of definition. A spring N', Figs. 8 and 9, engages with notches in the edge of the revolving diaphragm and centers the different apertures in it with the axis of the shutter. The spring is attached to the disk H by a screw and held in place by having its fixed end turned down into a hole in the disk.

The exposing-blades J J' are shown in Fig. 8 in full lines in the positions they occupy when the shutter is closed and in dotted lines in the positions they occupy during an exposure. In Fig. 20 they are shown in the position they occupy when the shutter is open. The blades are pivoted on opposite sides on the pivots or screws Z Z', inserted in the diaphragm H. It will be observed that each of the blades is provided with an opening A' and that the blades move inward during an exposure until their openings correspond, so that the light can pass through, and then close the aperture through the lens by returning to their original positions. The vibrating movement of the blades is secured from the setting-lever by the cam or incline C', Figs. 4, 6, 7, and 18, the pawl D', link E', and vibrating lever F', Fig. 9, having lugs G' $G^2$, which engage in slots H' $H^2$ in the blades J J'. The cam C' forces the pawl D' outward radially when the setting-lever swings from right to left in Fig. 4, and this movement is transferred by the stud I' to the link E' on the other side of the diaphragm H, and this moves the lever F', which actuates the blades. The vibration of the lever F' is indicated by the full and dotted lines in Fig. 9. The lever, link, and pawl are shown detached in Fig. 21. The pawl D' is forced radially outward by the cam C', (see Fig. 18,) and its return movement is secured by a spring K', Figs. 6, 7, and 15, arranged in any suitable manner to produce the requisite inward movement and the consequent closing of the blades. In the construction shown the spring K' serves both to return the pawl and its connected parts inward and to swing the pawl on the pivot I'. This spring is shown as held in place by lugs or lips M' $M^2$, Fig. 6, on the diaphragm H, with its free end bearing on the outer end of the pawl D'. The spring K' bears on a lateral extension $N^2$, Figs. 7 and 15, of the pawl, so that the pawl is given a constant tendency to swing from right to left, and is thereby held in contact with the stop O', inserted in the diaphragm. The outer end of the pawl may be grooved to receive and guide the spring. The spring K' is omitted in Figs. 4, 17, and 18. It will thus be seen that the pawl is free to swing during the setting movement of the lever B, the right-hand end of the cam C' swinging it into the position shown by the dotted lines $D^2$, Fig. 7, and by the full lines in Fig. 17, but that when the lever B swings from right to left during an exposure the pawl is forced radially outward by the cam C', as indicated in Fig. 18, the stop O' preventing its swinging to the left. The outward movement of the pawl thus secured is transmitted by the stud or screw I' to the opposite side of the diaphragm H and there is used to actuate the beam F' and the exposing-blades. The screw I' passes through a slot $P^2$, Fig. 6, in the diaphragm. The stud I' in the construction shown is a shoulder-screw, Fig. 10, inserted in the pawl D' and turning in the link E'. The arched beam F' is pivoted at R' to the diaphragm H. The link E' is pivoted at P', Fig. 9, to the arched beam. When the pawl D' is forced outward by the cam C' on the setting-lever, the link E' causes the beam F' to swing from the position indicated by the full lines in Fig. 9 to that shown by the dotted lines. The lugs G' $G^2$ on the beam engaged in the inclined slots H' $H^2$ in the blades by their movement cause the blades to swing on their pivots, so as to open the shutter, and on the return movement of the beam, caused by the spring K' forcing the pawl D' inward, the blades are swung back to their normal position, thereby closing the shutter. From Figs. 6, 7, 10, and 16 it will be observed that the lever B is offset at Y', so that it may swing clear of the pawl D'. The side arms X X are connected together by the bar U', on which the cam C' is formed and which also carries the stud or lug R. From the bar U' the arms V', offset at Y', extend outward and are connected together by a bar which carries the outer portion of the lever B. The stud R extends forward in front of the bars V', so as to engage with the lip S on the releasing-lever T and also with the time-lever D.

In order to regulate the speed of the exposure, I apply to the setting-lever B a friction-brake which can be adjusted so as to retard the return or exposing movement of the lever to any desired degree. As shown herein, this brake consists of a plate W', Figs. 4, 10, 11, and 23, a friction-washer X', Figs. 10 and 23, surrounding the pivot of the lever, and a screw and external brake-lever F, Figs. 1 and 23. The outer end of the plate W' is attached to the disk H and its inner end is perforated and surrounds the post O, on which the lever swings. The washer X', which may be of leather or any other suitable material, is interposed between the plate W' and the lever B. A corresponding washer may be employed between the lever B and disk H. A screw operated by the lever F is arranged to force the plate W' toward the disk, and so to produce a variable degree of friction between the washer and the lever. This may be secured in any suitable way, as by a screw on the lever F, threaded through the front plate A and bearing on the plate W' at its inner end, or, as in the construction indicated, by a nut T', threaded on a post S', which passes through the plate W' and is inserted in the disk. The lever F is attached to the nut T' in any suitable manner, so as to rotate it. The nut T' bears on the plate, so that by swinging the lever F outward any desired amount of friction can be produced on the lever B to retard its movement and lengthen the time of the exposure.

Proceeding now to a description of the time-exposure mechanism, it will be understood that for this purpose it is necessary to arrest the return movement of the setting-lever B when the blades are open and to hold the lever in that position during the exposure and to then allow the lever to move on to close the blades. The time-lever D is pivoted at $E^2$, a spring $F^2$ being arranged to give the inner end of the lever a constant tendency to move inward. The time-lever is locked in the outer position (indicated by the full lines in Figs. 4, 5, and 11) by a suitable catch which, as shown, is formed by the screw $J^2$ inserted through the casing I and having a lip or hook on its inner end which engages with an opening or lip $K^2$ in the lever D, which springs laterally to engage with the hook. (See Fig. 27.) In this way the lever is locked in the outer position when not in use and then the stud R will swing backward and forward without coming in contact with any part of it. Any other suitable locking device may be applied to the time-lever. When the outer end of the lever D is moved upward into the position indicated by the dotted lines in Fig. 4, the inner end is disengaged from the hook $J^2$ and the catch $Q^2$ is interposed in the path of the stud R, this position of the parts being indicated at $Q^3$, Fig. 5, in dotted lines, and in Fig. 24. The inner end of the lever D is provided with a lip $U^2$, which projects inward and bears against the upper side of the releasing-lever T when the lever D is disengaged from the hook $J^2$. The catch $Q^2$ is offset from the lever D—that is, as shown in Figs. 10, 13, and 14, it is bent outward and then downward and then inward, terminating in an inwardly-projecting lug $V^2$, which reaches inward so as to be presented in the path of the stud R, which can pass freely above it. In making a time exposure the stud R on escaping from the catch S is immediately arrested by the lug $V^2$; but the springs on the levers T and D then press their inner ends inward, the lug $V^2$ is forced inward and disengaged from the stud R, which is then arrested with the blades wide open by the lip or catch $Y^2$ on the end of the lever D, in which position the parts will remain until the releasing-lever T is again operated by the thumb-piece C or the bulb, and this movement by the lug $U^2$ raises the lever D, disengages the catch $Y^2$ from the stud R, and permits the lever B to complete its movement and close the blades. The position of the parts when the catch $Y^2$ is engaged with the stud R is indicated in Fig. 25. $B^2$, Fig. 3, indicates a flange by which the lens-mount is attached to the camera. Any other suitable device may be employed for this purpose.

In Fig. 10 my present invention is shown as employed with a single lens $C^2$; but it is obvious that a lens may also be used in front of the shutter. The plate A is shown as provided with a projecting tube adapted to receive a lens, its interior thread being protected by the beveled ring $Z^2$.

I claim—

1. The combination of the vibrating setting-lever having an elongated central opening, the releasing-lever, the pivoted exposing-blades, and suitable operating mechanism between the setting-lever and the blades, substantially as described.

2. The combination with the vibrating setting-lever having an elongated opening, and an inclined cam, of the releasing-lever, the radially-movable pawl, the pivoted exposing-blades, and suitable operating mechanism between the pawl and the blades, substantially as described.

3. The combination with the vibrating setting-lever of the releasing-lever, the pivoted exposing-blades, suitable operating mechanism between the setting-lever and the brake, and an adjustable friction-brake applied to the setting-lever, substantially as described.

4. In a photographic shutter, the combination of the vibrating setting-lever with a friction-brake applied thereto, consisting of the plate W', screw S', friction-washer X', and external lever F, substantially as described.

5. The combination with the pivoted and slotted exposing-blades, of the vibrating beam F', the link E', pawl D', and means for actuating the pawl, substantially as described.

6. The combination with the pivoted and slotted exposing-blades, of the vibrating beam F', the link E', pawl D' and the vibrating setting-lever B having cam C', adapted to actuate the pawl, substantially as described.

7. The combination with the diaphragm, of the releasing-lever, having catch S, the vibrating apertured setting-lever B having stud R, the pawl D', link E', vibrating beam F' and pivoted blades J J', substantially as described.

8. The combination with the diaphragm, of the releasing-lever having catch S, the vibrating apertured setting-lever B having stud R, the pawl D', link E', vibrating beam F', pivoted blades J J', and the time-exposure lever D, substantially as described.

9. The combination with the vibrating setting-lever of the releasing-lever the time exposing-lever and its locking-catch $J^2$, substantially as described.

10. The combination with the vibrating setting-lever of the releasing-lever, the pivoted blades, the arched beam, suitable connecting mechanism between the beam and the setting-lever, and the time-exposure lever, provided with catches adapted to arrest the movement of the setting-lever, substantially as described.

LOUIS J. VOGT.

Witnesses:
HENRY M. REICHENBACH,
GEO. B. SELDEN.